US009679286B2

(12) United States Patent
Colnot et al.

(10) Patent No.: US 9,679,286 B2
(45) Date of Patent: Jun. 13, 2017

(54) METHODS AND APPARATUS FOR ENABLING SECURE NETWORK-BASED TRANSACTIONS

(71) Applicant: OHVA, Inc., San Jose, CA (US)

(72) Inventors: Vincent Cedric Colnot, Milpitas, CA (US); Ty Fellers, Little Mountain, SC (US)

(73) Assignee: OHVA, Inc., San Jose, CA (US)

(*) Notice: Subject to any disclaimer, the term of this patent is extended or adjusted under 35 U.S.C. 154(b) by 98 days.

(21) Appl. No.: 14/636,674

(22) Filed: Mar. 3, 2015

(65) Prior Publication Data

US 2015/0178719 A1 Jun. 25, 2015

Related U.S. Application Data

(63) Continuation of application No. 14/524,842, filed on Oct. 27, 2014, now Pat. No. 9,003,508, which is a
(Continued)

(51) Int. Cl.
*G06Q 20/34* (2012.01)
*H04L 9/32* (2006.01)
(Continued)

(52) U.S. Cl.
CPC ....... *G06Q 20/341* (2013.01); *G06Q 20/4018* (2013.01); *H04L 9/0844* (2013.01);
(Continued)

(58) Field of Classification Search
CPC .......... G06Q 20/3272; G06Q 20/3278; G06Q 20/34; G06Q 20/123; G06Q 20/341;
(Continued)

(56) References Cited

U.S. PATENT DOCUMENTS

| 4,860,336 A | * | 8/1989 | D'Avello | G06Q 20/32 |
| | | | | 379/114.19 |
| 5,388,148 A | * | 2/1995 | Seiderman | G06Q 20/04 |
| | | | | 379/114.19 |

(Continued)

FOREIGN PATENT DOCUMENTS

KR 20030076045 * 10/2002 ............. G06K 17/00

OTHER PUBLICATIONS

"Turning your mobile into a magnetic stripe reader", Deepquest, Apr. 13, 2005, pp. 1-6.*
(Continued)

*Primary Examiner* — Mohammad Z Shaikh
(74) *Attorney, Agent, or Firm* — Donald R. Boys; Centreal Coast Patent Agency, Inc.

(57) ABSTRACT

An apparatus includes a transaction card bearing data and having an output interface capable of transmitting the data, a card reader having an input interface enabled to accept the data from the output interface of the transaction card, conversion circuitry converting the card data to an analog modulated signal, and an output pin from the card reader adapted to engage in a microphone port of a computerized appliance, the output pin providing the analog modulated signal to the port, and thence to the computerized appliance.

4 Claims, 15 Drawing Sheets

Related U.S. Application Data continuation of application No. 11/533,030, filed on Sep. 19, 2006, now abandoned.

(60) Provisional application No. 60/719,273, filed on Sep. 20, 2005.

(51) Int. Cl.
  *H04L 29/06* (2006.01)
  *H04L 9/08* (2006.01)
  *G06Q 20/40* (2012.01)

(52) U.S. Cl.
  CPC .......... *H04L 9/3213* (2013.01); *H04L 9/3271* (2013.01); *H04L 63/083* (2013.01); *H04L 63/0853* (2013.01); *H04L 63/10* (2013.01); *H04L 2209/56* (2013.01); *H04L 2209/80* (2013.01)

(58) Field of Classification Search
  CPC ...... G06Q 20/20; G06Q 20/32; G06Q 20/325; G06Q 30/0601; G06K 19/07; H04M 2250/14; G07F 7/0873; G07F 7/0886
  See application file for complete search history.

(56) References Cited

U.S. PATENT DOCUMENTS

| | | | | |
|---|---|---|---|---|
| 5,729,591 | A * | 3/1998 | Bailey | G06Q 20/32 379/91.01 |
| 5,754,655 | A * | 5/1998 | Hughes | G06Q 20/04 235/380 |
| 6,234,389 | B1 * | 5/2001 | Valliani | G06Q 20/20 235/379 |
| 6,481,623 | B1 * | 11/2002 | Grant | G06K 7/084 235/380 |
| 6,607,136 | B1 * | 8/2003 | Atsmon et al. | 235/492 |
| 7,163,148 | B2 * | 1/2007 | Durbin | G06K 7/084 235/449 |
| 7,240,836 | B2 * | 7/2007 | Vrotsos | G06Q 20/341 235/380 |
| 7,490,777 | B2 * | 2/2009 | Walsh | G06K 7/084 235/462.01 |
| 7,726,566 | B2 * | 6/2010 | Brown | G06K 7/0008 235/435 |
| 7,761,374 | B2 * | 7/2010 | Sahota et al. | 705/39 |
| 7,810,729 | B2 * | 10/2010 | Morley, Jr. | 235/435 |
| 8,376,239 | B1 * | 2/2013 | Humphrey | G06K 7/084 235/493 |
| 8,612,352 | B2 * | 12/2013 | Dorsey | G06Q 20/3226 235/449 |
| 9,016,572 | B2 * | 4/2015 | Babu | G06Q 20/322 235/435 |
| 9,183,480 | B1 * | 11/2015 | Quigley | G06K 19/06196 |
| 9,224,142 | B2 * | 12/2015 | Lamba | G06Q 20/322 |
| 9,262,777 | B2 * | 2/2016 | Lamba | G06Q 20/322 |
| 9,305,314 | B2 * | 4/2016 | Babu | G06Q 20/3224 |
| 9,324,100 | B2 * | 4/2016 | Sather | G06Q 20/322 |
| 9,495,675 | B2 * | 11/2016 | Sather | G06Q 20/3224 |
| 9,495,676 | B2 * | 11/2016 | Lamba | G06Q 20/322 |
| 2002/0008145 | A1 * | 1/2002 | Walsh | G06K 7/084 235/462.46 |
| 2004/0039919 | A1 * | 2/2004 | Takayama | G06Q 20/04 713/180 |
| 2004/0058705 | A1 * | 3/2004 | Morgan | G06Q 20/341 455/556.1 |
| 2004/0093436 | A1 * | 5/2004 | Colnot | 710/1 |
| 2004/0230489 | A1 * | 11/2004 | Goldthwaite | G06K 7/0004 705/26.1 |
| 2004/0242267 | A1 * | 12/2004 | Walsh | G06K 7/084 455/556.1 |
| 2005/0236480 | A1 * | 10/2005 | Vrotsos | G06Q 20/341 235/439 |
| 2010/0108762 | A1 * | 5/2010 | Morley, Jr. | G06K 7/083 235/449 |
| 2010/0314446 | A1 * | 12/2010 | Morley, Jr. | G06K 7/083 235/449 |

OTHER PUBLICATIONS

"Turning your mobile into a magnetic stripe reader", Deepquest. Apr. 13, 2005, pp. 1-6.*
"Magnetic stripe reader circuit", dated Jan 28, 1997, pp. 1-7, Luis Padilla Visdomine.*
"The simplest magnetic stripe reader", www.gae.ucm.esi~padilla/extrawork/soundtrack.html, Jan. 27, 2003, Luis Padilla Visdomine, pp. 1-5.*
"Travel Industry targeted for Palm PDA card reader", http:/www.m-travel.com/news/2001/08/travel_industry.html, Aug. 22, 2001, pp. 1-2.*
"Magnetic stripe reader/writer" http://www.gae.ucm.es/~padilla/extrawork/stripe.html, Oct. 29, 1996, pp. 1-2.*
Visdomine, Luis Padilla, Turning your mobile into a magnetic stripe reader, padilla@gae.ucm.es, My PGP public Key, http:/www.gae.ucm.es/~padilla/extrawork/mobilesoundtrack.html, Aug. 30, 2004.

* cited by examiner

METHODS AND APPARATUS FOR ENABLING SECURE NETWORK-BASED TRANSACTIONS

CROSS-REFERENCE TO RELATED APPLICATIONS

The present invention claims is a Continuation of U.S. application Ser. No. 14/524,842 filed Oct. 27, 2014, which was a continuation of U.S. application Ser. No. 11/533,030, filed Sep. 19, 2006, which claims priority to a U.S. provisional patent application Ser. No. 60/719,273 filed on Sep. 20, 2005. The referenced applications are incorporated herein at least by reference.

BACKGROUND OF THE INVENTION

1. Field of the Invention

The present invention is in the field of electronic transactions carried out over a network connection and pertains particularly to methods and apparatus for ensuring identity security for the transaction parties.

2. Discussion of the State of the Art

Integrated circuit cards, commonly referred to as smart cards, are widely used in stores to secure electronic payments. The online market has not adopted smart cards, although they provide the best security to conduct electronic commerce. The main reasons are the high cost of the card reader and the complexity of the system for most people. Not only a card but also a reader must be provided to the millions of potential end-users who comprise this market base.

The inventor is aware of a method and apparatus to secure online transactions on the Internet. The system includes a smart card transmitting an identification sequence to a PC in the form of a modulated signal, a card reader plugged into the microphone input of the PC sound card, and a PC applet demodulating the identification sequence. The card reader is characterized by the absence of processing means.

The inventor is also aware of a secure memory device for a smart card with a modem interface. The secure memory includes a rewritable memory such as an EEPROM, a processing unit or a microprocessor, an on-chip oscillator, an ISO 7816 interface, and a one-wire modem interface. The memory is characterized in that both communication interfaces are bi-directional and share the same terminal. The modem interface is exchanging data with the host in the form of a modulated signal by means of a card reader characterized by the absence of processing means.

The inventor is further aware of a method and apparatus to secure online transactions over the phone. The method includes a smart card transmitting an identification sequence to an IVR server in the form of a modulated signal, a card reader plugged into the telephone line, and an IVR applet demodulating the identification sequence. The card reader is characterized by the absence of processing means.

What is clearly needed is improved and more secure client/server methods including transmission packaging of secure authentication over a network aided in some case by user-friendly peripherals and devices for performing secure transactions over a data-packet-network.

BRIEF SUMMARY OF THE INVENTION

In one embodiment of the invention an apparatus is provided, comprising a transaction card bearing data and having an output interface capable of transmitting the data, a card reader having an input interface enabled to accept the data from the output interface of the transaction card, conversion circuitry converting the card data to an analog modulated signal, and an output pin from the card reader adapted to engage in a microphone port of a computerized appliance, the output pin providing the analog modulated signal to the port, and thence to the computerized appliance.

In one embodiment of the apparatus the computerized appliance is enabled to communicate on a network, and has sound conversion circuitry converting the analog modulated signal to digital data. Also in one embodiment the computerized appliance comprise a processor executing coded instructions from a non-transitory medium, and the coded instruction executed by the processor cause the data to be used in a communication on the network. Also in one embodiment the transaction card comprises an electronic chip having a digital memory, and the card value is stored as a sequence of bits in the digital memory. In one embodiment the analog modulated signal is derived from the card value stored in the digital memory.

In one embodiment the conversion circuitry is a part of the circuitry of the electronic chip. Also in one embodiment the coded instructions provide two-way communication with a server hosted by a financial institution or an on-line merchant, and the two-communication facilitate transactions by an owner of the card with the financial institution or purchases by the owner of the card with an on-line merchant. And in one embodiment the coded instructions operate to accept a card verification code (CVV) in the card data, to use the CVV in the purchases or transactions, and for each transaction or purchase accomplished, a new CVV is created and stored in the card data.

In another aspect of the invention a method is provided, comprising coupling a transaction card bearing data and having an output interface capable to transmit the data to a card reader having an input interface enabled to accept the data from the output interface of the transaction card, converting the card data to an analog modulated signal by conversion circuitry, and providing the analog modulated signal by an output pin from the card reader engaged in a microphone port of a computerized appliance, to the computerized appliance.

In one embodiment of the method the computerized appliance communicates on a network, and has sound conversion circuitry converting the analog modulated signal to digital data. Also in one embodiment the computerized appliance executes coded instructions on a processor from a non-transitory medium, and the coded instruction executed by the processor cause the data to be used in a communication on the network. Also in one embodiment the transaction card comprises an electronic chip having a digital memory, and the card value is stored as a sequence of bits in the digital memory. And in one embodiment the analog modulated signal is derived from the card value stored in the digital memory.

In still another embodiment of the method the conversion circuitry is a part of the circuitry of the electronic chip. In one embodiment the coded instructions provide two-way communication with a server hosted by a financial institution or an on-line merchant, and the two-communication facilitate transactions by an owner of the card with the financial institution or purchases by the owner of the card with an on-line merchant. And in one embodiment the coded instructions operate to accept a card verification code (CVV) in the card data, to use the CVV in the purchases or transactions, and for each transaction or purchase accomplished, a new CVV is created and stored in the card data.

BRIEF DESCRIPTION OF THE DRAWING FIGURES

DETAILED DESCRIPTION

Figure 1:
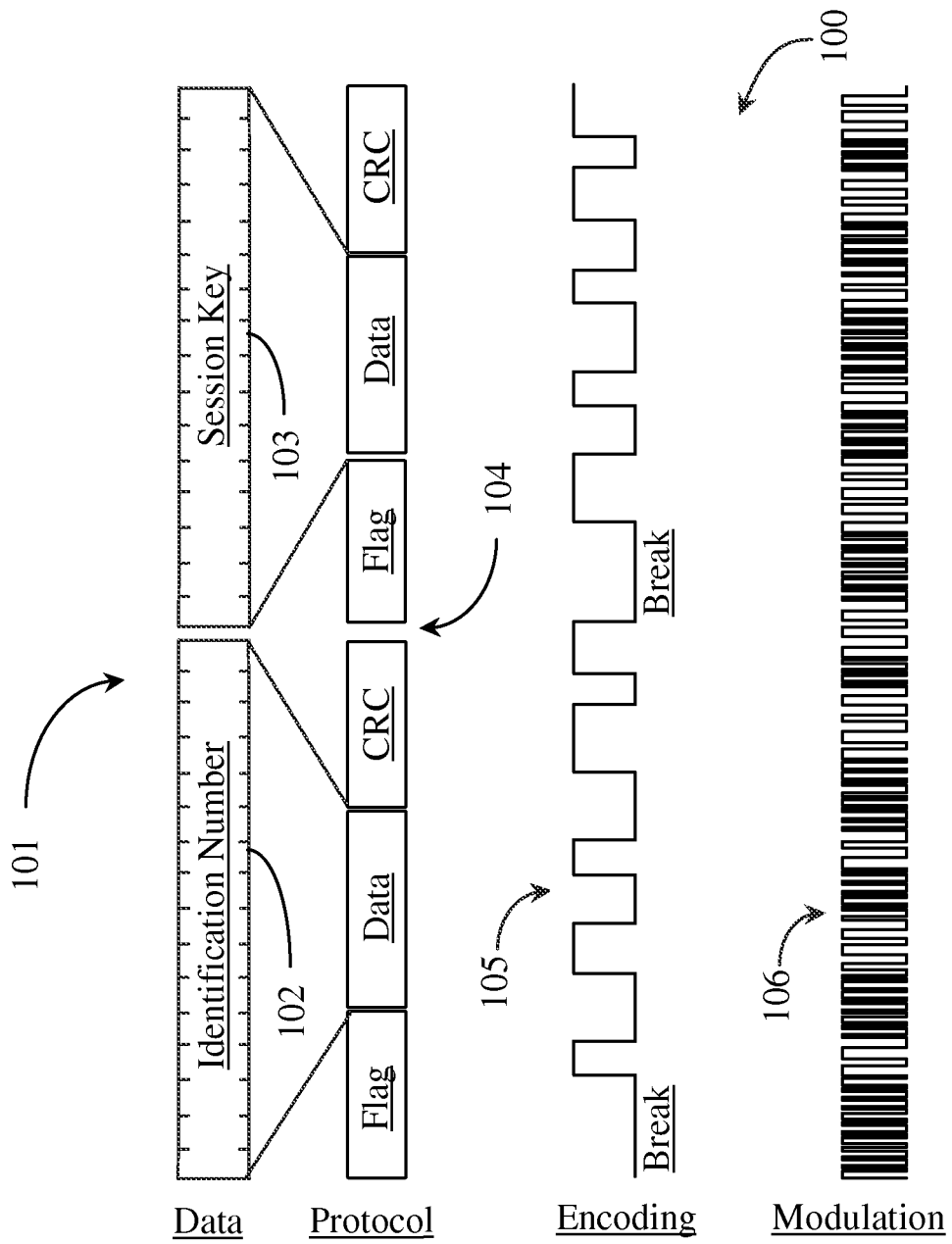
FIG. 1 is a block-diagram illustrating a secure transmission package of a secure identification number and session key according to an embodiment of the invention.

The inventors provide a system that may be used in a variety of ways using hardware and/or software to provide secure authentication over a network for users and user groups. The present invention is described according to various embodiments and in enabling detail supporting each of those embodiments. More particularly, the system uses a modulated sound consisting at least in part of an identification number and a session key.

It is important to note herein that in one embodiment, the identification number may, for example, contain 16 digits of data and may be a fixed identification number (ID) or on that is dynamically assigned. It may also be encoded to include an error detection bit. In this case the identification number may also be encrypted with a proprietary key to ensure the provider authorized to provide the software of the invention may practice the invention in a way that is functional.

The following example demonstrates a configuring and encryption of a 16-digit ID number for use according to an embodiment of the invention. The ID number may contain fewer or more than 16 digits. The number 16 is exemplary. ID number=1 2 3 4 5 6 7 8 9 0 0 1 2 3 4 5: The 16 digits are grouped into 8 decimal numbers value from 00-99 and these are 12, 34, 56, 78, 90, 01, 23, and 45. Each of the decimal numbers are converted into hexadecimal numbers value from $00-$63 and these are $0C, $22, $B8, $4E, $5A, $81, $17, $2D. The most significant bit of each byte of data is reserved for storing an error detection or parity bit. The string of hexadecimal values after conversion is $0C, $22, $B8, $4E, $5A, $81, $17, and $2D.

The ID number is then encrypted by adding an exclusive logical operator (XOR) that in this example is a proprietary 8-byte applet key. An example of the applet key is $99, $AA, $BB, $CC, $DD, $EE, $FF, $55. The resulting encrypted ID string is $95, $88, $03, $82, $87, $6F, $E8, $78. In this example, a session key is provided to generate a hash of the user password. The hashed password is valid only for one session.

In a variation of this embodiment, a new session key is generated each time a user attempts authentication and the user token is activated. An iterative algorithm $[C_{i+1}=G(N, S, C_i)]$ is used to generate a new key. G=a one way function such as one based on a stream cipher, an encryption method that works on a continuous stream of data rather than individual data blocks. N=the client or user ID number described above whether encrypted or not. S=a proprietary seed known only to the issuer. $C_i$=the current session key. The session key may be 8 bytes or longer depending on the token capabilities. The inventor provides the above information for clarity relative to encryption methods only that are described in detail further below according to several embodiments. Other variants may be used without departing from the spirit and scope of the present invention. However, the function of a two factor authentication where one factor is an identification number and the other is a modulated sound is important in several aspects of the present invention as will be seen further below.

FIG. 1 is a block-diagram illustrating a secure transmission package 100 of a secure identification number and session key according to an embodiment of the invention. Package 100 represents an encoded and sound modulated transmission carrying a data payload 101 including a secure identification number 102 and a session key 103 comprising 2 data frames. Package 100 includes a protocol layer 104, an encoding layer 105, and a sound modulation layer 106. Package 100 is assembled at a client-operated personal computing appliance (PC) and is transmittable over a data-packet-network such as a local area network (LAN) or a wide area network (WAN) where it is decipherable at the other end, typically at a server adapted to authenticate secure access to some network-based resource.

Data payload 101 includes ID number 102, typically in an encrypted state. However, encryption of ID number 102 is not specifically required in order to practice the present invention. Session key 103 is used to encrypt a user password and is a unique key provided by a key issuer. A session key may be a dynamic key good only for one session as described further above. However, in some cases it may be a static key good for more than one session.

ID number 102 and Session key 103 are embedded into protocol layer 104 each chunk of data starts with a flag byte indicating the type of data enclosed and ends with a cyclical redundancy-checking (CRC) bit for transmission error detection comprising a data frame of a data type. The data frames carrying the ID number and session key are encoded with encoding breaks.

In this example, the frames are encoded using a Miller code known to the inventors. This encoding creates transitions every 1 elementary time unit (etu), every 1.5 etus, and every 2 etus even if the data doesn't change. Any other known code could be used in place of the Miller code, although other codes might create more transitions. The Manchester code for instance creates transitions every 0.5 etu and every 1 etu.

The encoding process in this example transmits the data (ID number and session key) and bit clock together in a same signal. The flag byte contains an encoding break, which is a longer time without data transition (3 etu for instance), signaling the beginning of a frame.

In this embodiment, the encoded bit flow is modulated as demonstrated by modulation layer 106 using a frequency-shift keying (FSK) modulation technique creating an analog waveform for representing logic 1 and another for representing logic 0 each wave form at different frequencies. The FSK modulation of the data is performed by a soft modem that is provided in an applet downloaded to a client practicing the present invention. The modem generates an audible sound compatible with PC sound card capabilities. The modulation frequency may be in the range of 0 Hz to 20 kHz for PC server application or in the range of 300 Hz to 3 kHz, which is compatible with telephone networks (wired and mobile). The modulated signal is demodulated by an FSK modem at the server.

Figure 2:
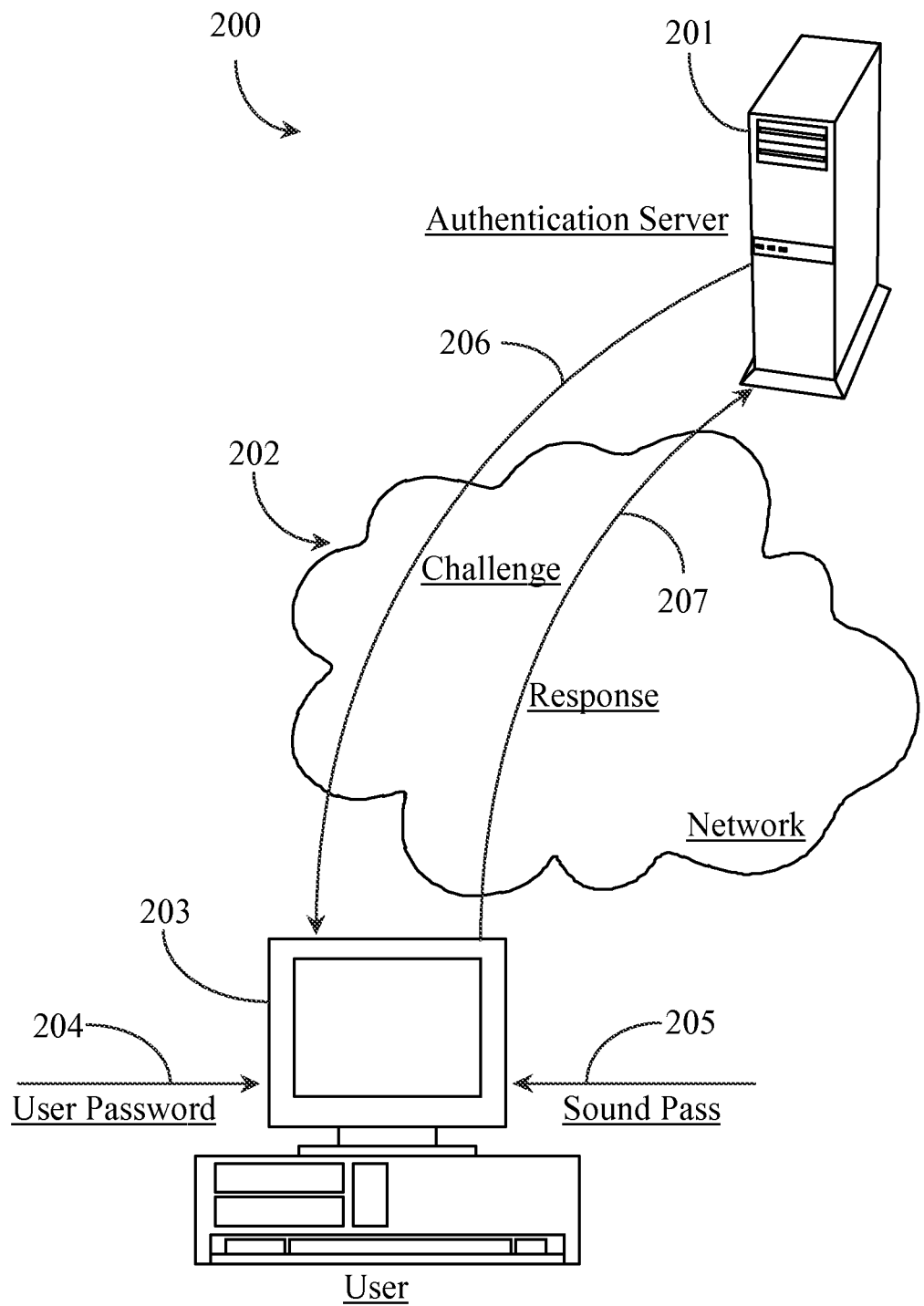
FIG. 2 is an architectural overview of interaction between a user and an authentication server according to an embodiment of the present invention.

FIG. 2 is an architectural overview 200 of interaction between a user and an authentication server according to an embodiment of the present invention. Overview 200 includes an authentication server adapted to authenticate a user 203 for access to a secure resource. Server 201 may be any type of server including a transaction portal authenticating transaction for a group of web merchants or banks. It may also be any server adapted to handle secure transactions for individuals. The server may simply provide secure login services to a secure area instead of enabling transactions. A secure authentication may be for the purpose of authentication one or more transactions or for granting network access to one or more than one secure resource. Likewise one server may perform both secure login services and secure transaction services.

In this example, user 203 is operating a PC having a network connection to server 201 over a network 202. Network 202 may be an Internet network, an Intranet network, or a wireless telephone network without departing from the spirit and scope of the present invention. In this example, to be authenticated user 203 has a password or personal identification number (PIN) and a token that generates a session key that is useable only once in this embodiment.

Before practicing the invention for the first time, user 203 receives an applet from server 201. The applet contains a modem and a session key issued by the server. The modem demodulates and decodes the signal and includes an encryption algorithm for handling the challenge/response interaction between the user and server. In this example, user 203 enters a password or pin code locally and inserts the sound token, which generates the modulated sound into an audio input on the PC. The session key automatically encrypts the password or PIN ensuring a permanent password encryption state meaning that the password or PIN is never transmitted over the network to the server in a clear or unencrypted state.

In this example user 203 is not required to enter a username. Server 201 sends the correct user name when it receives the correct ID number from the token on the client PC. Only a valid server can send the correct user name. Therefore user 203 is entering his password safely and securely.

Figure 3:
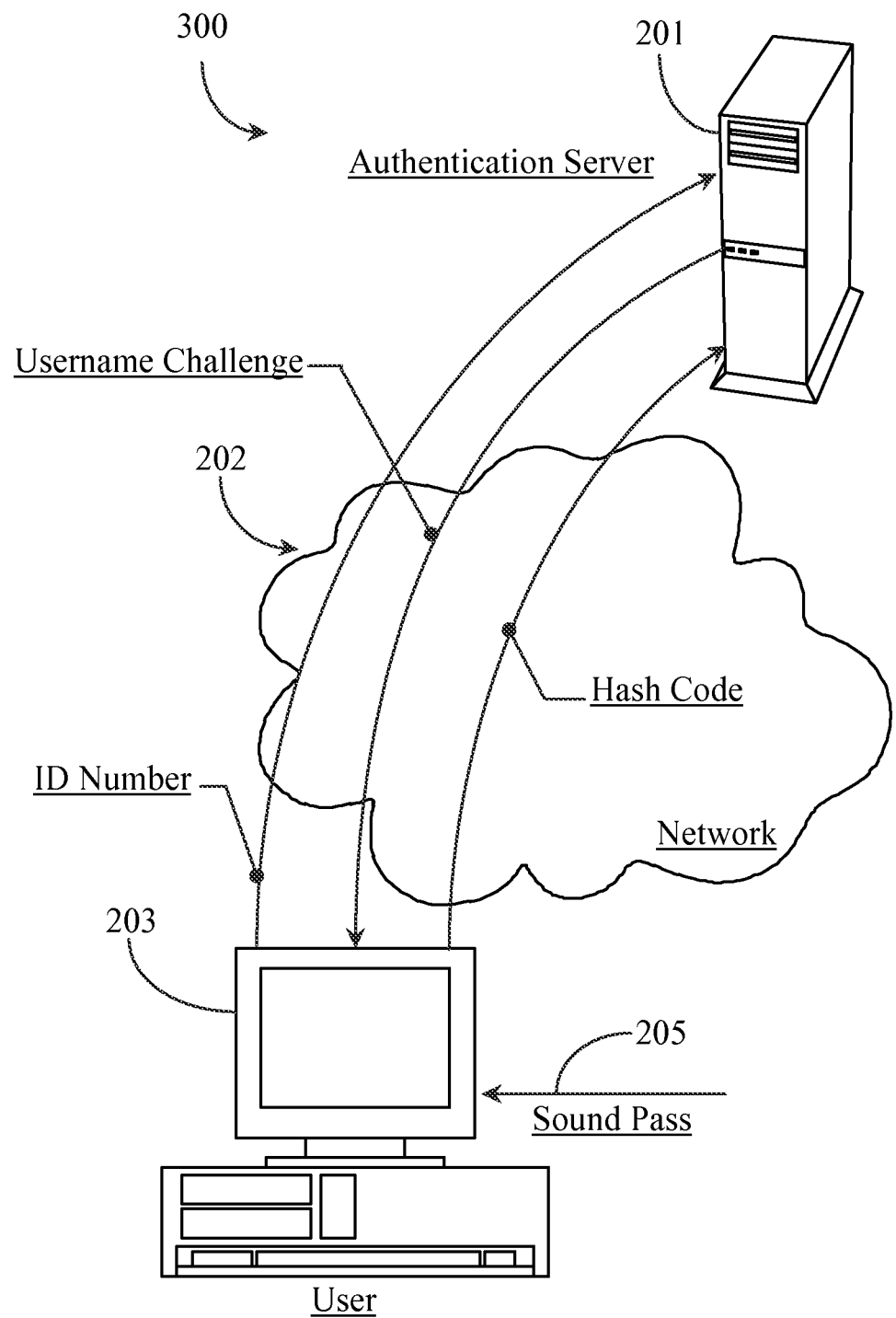
FIG. 3 is an architectural overview of interaction using the system of the invention according to another embodiment of the present invention.

FIG. 3 is an architectural overview 300 of interaction using the system of the invention according to another embodiment of the present invention. Overview 300 includes authentication server 201, network 202 and user 203 having the same description and element numbers introduced in the description of FIG. 2 above. In this example user authentication is demonstrated.

In this embodiment the applet on PC 203 generates a hash code based on the session key, challenge, and password. The challenge is a random number generated by server 201 for each transaction that requires authentication. Access is granted to the user operating PC 203 if the server authenticates the hash code, which is sent from the PC to the server over the network.

The hash code is the session key in this example. As the session key, the hash code is valid only once. The hash code is also the server challenge in this example. As the server challenge, the hash code is valid for a short period of time. In this embodiment server 201 deduces the current session key referred to herein for discussion purposes as (Ci) from the last session key used, which is stored at the server. The previous session key is referred to herein for discussion purposes as (Ci-1) or as (Co) in some embodiments is stored in the server database.

Server 201 generates a hash code of the user password stored at the server using the session key. In this example, server 201 compares the hash of the user password to the hash received. The user is authenticated for a transaction if both hash codes are identical. This indicates that both PC 203 and server 201 have used the same session key and password. In this case, server 201 stores (Ci-1) by (Ci) in the database and (Ci) cannot then be reused. In this interaction an ID number sent to server 201. The server sends a username challenge. The username challenge is sent in the form of a hash back to PC 203. The PC sends a hash code derived from the demodulated token parameters back to server 201. The server, in the meantime generates its own hash code and when the server receives the client response, a comparison of the hash codes is performed. If the hash codes are identical, the user is granted access or otherwise is validated as the correct user authorized to complete the transaction during the current session.

In a preferred embodiment, the sound signal or sound pass, as referred to by the inventor and illustrated herein as sound pass 205 in FIGS. 2 and 3, may be provided in at least three system compatible forms. In fact any hardware device capable of playing a sound may be incorporated as a sound pass token. Therefore, the token may be a hardware device or a software file (soft form) like a Way file for instance. One device that is disclosed herein and that may serve as a sound pass token is a smart card used in conjunction with a card reader. Another device that may be used as a sound pass token is a unique key device termed a key jack by the inventor. The key jack may be adapted to be inserted into any "audio in" line on a PC such as the microphone port, telephone jack, or any auxiliary port having connection directly or indirectly to the sound card on the PC. The key jack is manipulated to play the modulated sound pass by pressing a button provided on the device when the device is properly inserted into the PC. The applet on the PC makes use of the sound pass token, demodulating the signal and generating the hash code for send to the authentication server.

Yet another compatible sound token is soft version in the form of a sound file deliverable from a mobile device like a cell phone, a personal digital assistant, or a handheld music player such as a Sony music player or an Ipod™. As long as the sound file can be input into the PC and recognized by the applet running on the PC the present invention can be practiced successfully.

Figure 4:
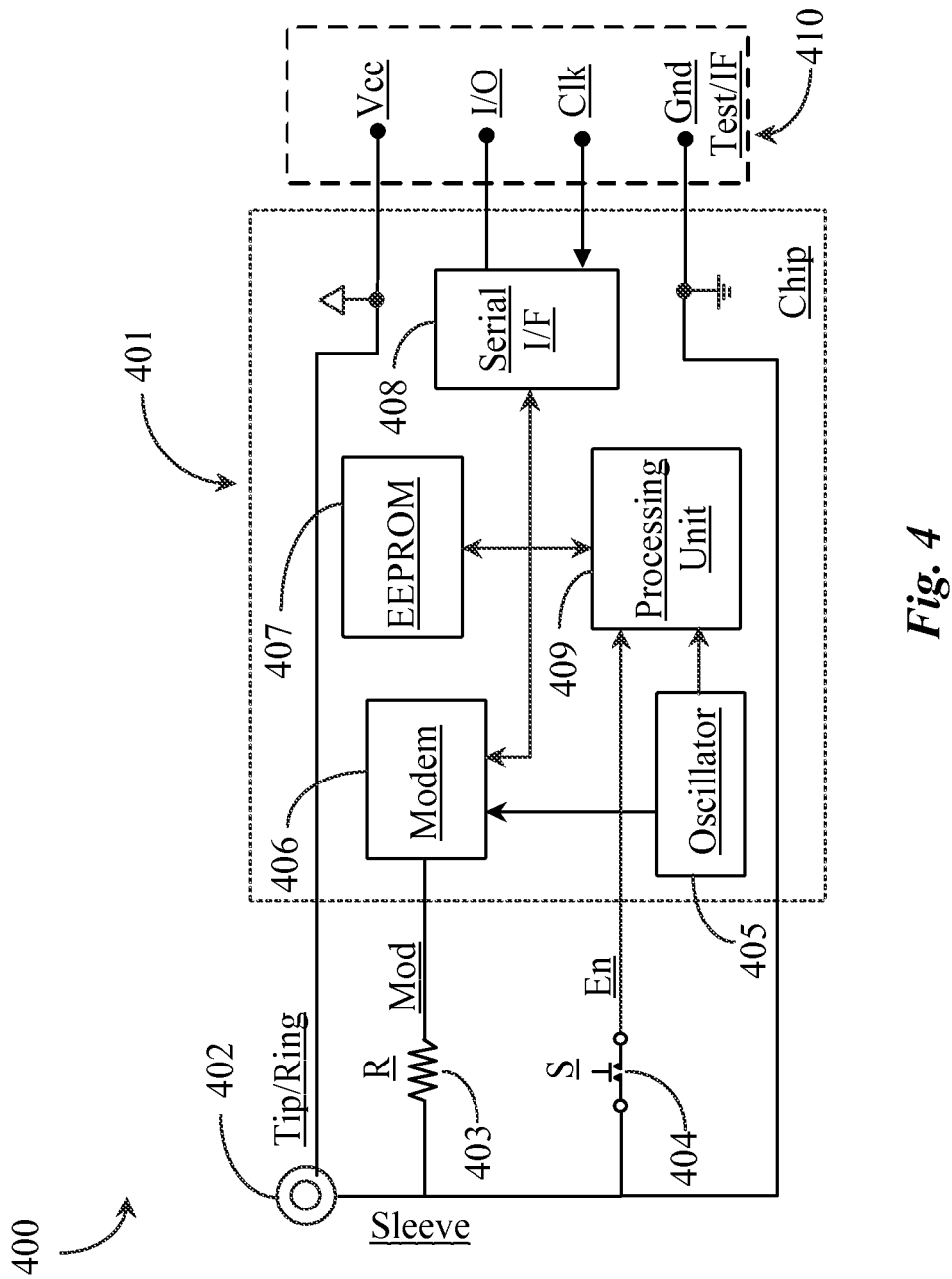
FIG. 4 is a block diagram illustrating basic electronics of a key jack sound pass generator according to an embodiment of the present invention.

FIG. 4 is a block diagram illustrating basic electronics 400 of a key jack sound pass generator according to an embodiment of the present invention. In one embodiment a semiconductor chip installed enclosed in a hand-held device like a key jack discussed above that plugs into the microphone input or other line input on a PC generates the sound pass signal. In one embodiment, the key jack may be plugged into the sound input or headset connector jack associated with a mobile smart telephone or PDA enabling authentication through a telephone network.

In this example, chip circuitry 400 includes an electrically erasable programmable read-only memory (EEPROM) 401. In one embodiment, a re-writable flash memory may be used. A modem circuit 406, an on-chip oscillator 405, a processing unit 409, and a serial input interface 408.

A tip/ring interface for plugging into a microphone jack or other line in is illustrated in reference to the chip circuitry and electrical paths. Chip 400 derives its voltage power from a sound card that provides from +3 to +5V direct current (DC). A testing interface 410 is provided on chip 400 for the purpose of enabling remote access to the chip for erasing and reprogramming and testing. All components on the chip are accessible or may at least be tested through interface 408 without removing the chip from its host. Processing unit 409 may be a small microprocessor. Testing interface 410 includes a connection to power and a connection to ground. A sound pass file may be stored on chip 400 in EEPROM 407 for use as a sound pass token. The file may be any suitable compression format including MP4, Way, AVI, or others. Modem 406 and oscillator 405 generate the signal in the form of sine waves that are demodulated by a modem provided in the applet on the users PC.

The applet is, of course running when the sound pass token is input for authentication using a key jack. The resistor adapts the impedance between the chip 401 and the microphone or other input. Switch 404 activates the modem 406, which in turn generates the modulated sound pass or signal input to the sound card on the PC. A user pushing a button, switch, or other mechanism on the external surface of the device hosting the chip operates or activates the modem to deliver the modulated sound one time. Test interface 410 is a bi-directional interface. As a mobile device key jack 400 may be used at virtually any PC station or if so adapted any mobile device capable of a bi-directional network connection. Therefore, a user may perform a secure login without physically using a clear text password or username that might later be revealed through a key logger program or the like.

Figure 5:
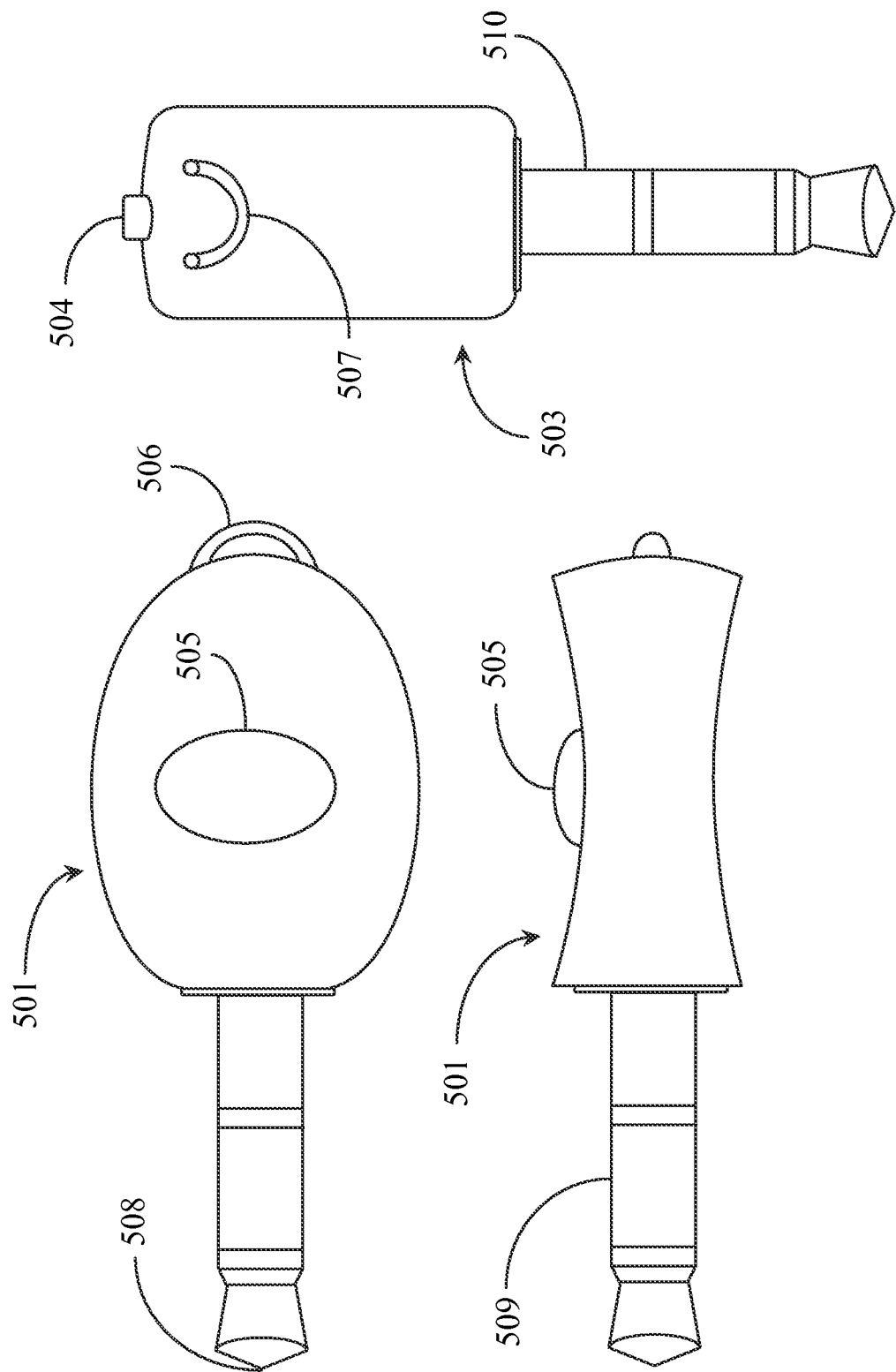
FIG. 5 is a plan view of design options for a key jack signal generator according to embodiments of the present invention.

FIG. 5 is a plan view of design options for a key jack signal generator according to embodiments of the present invention. In this example, the circuitry described above is housed within a convenient and mobile key jack device that can be worn around a user's neck or may be placed on a key ring for convenience. A key jack design 501 is illustrated in both a top view and in a side view. Device 501 includes a tip interface 508 adapted to fit into a microphone input on a PC or other computing appliance. The ring interface is illustrated herein as ring 509. In one embodiment another plug interface may be used instead such as a telephone jack or other line in design capable of transmitting audio in to pass the signal into the computing appliance. Device 501 includes the sleeve illustrated in the device to the right as sleeve 510 functioning as ground.

In this case, device 501 is molded from a durable polymer and includes an activation switch in the form of a button 505. A user may insert device 501 into a microphone input and depress button 505 to close switch 404 described further above thereby activating the modem to generate and modulate the sound pass signal. The sound pass signal contains the ID number and session key embedded in the modulated sound.

Key jack device 501 may be updated to change token parameters dynamically through the test interface. Optionally, other designs may be provided such as with a key jack device 503 illustrated in a position rotated 90 degrees from device 501. Device 503 has a user activation button 504 located at the end of the device opposite tip/ring and sleeve assembly 510 in which the sleeve 510 is numbered. A convenient ring attachment 507 provides an interface for attaching the same to a rope or key ring. Device 503 has an alternate shape than device 501. There are many variant design options available.

Figure 6:
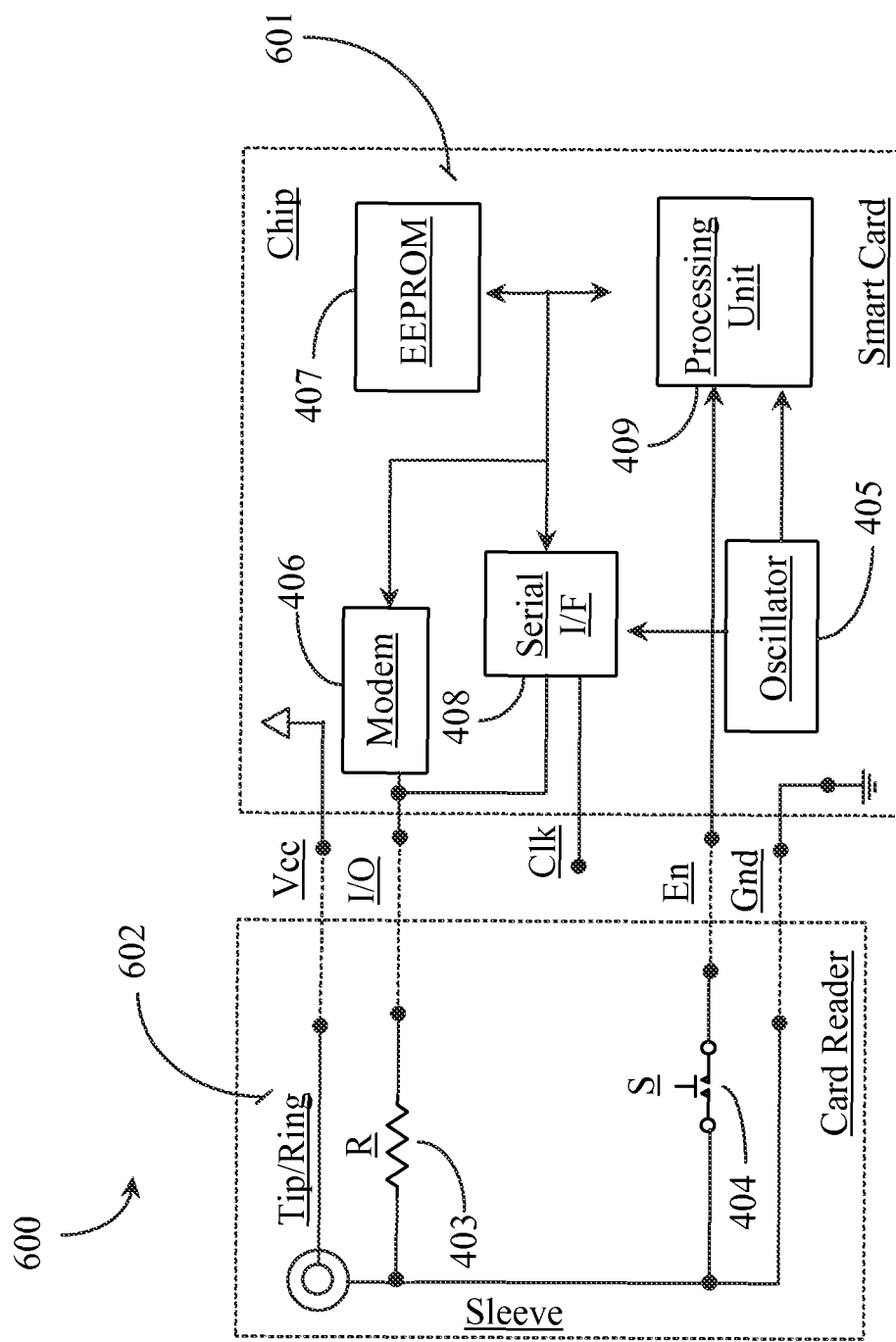
FIG. 6 is a block-diagram illustrating basic electronics of a smart card signal generator coupled to a card reader according to another embodiment of the present invention.

FIG. 6 is a block-diagram 600 illustrating basic electronics of a smart card signal generator 601 coupled to a card reader 602 according to another embodiment of the present invention. Diagram 600 includes a smart card 601 with the sound pass chip embedded therein. The card plugs into card reader 602, which in turn is plugged into the microphone input of the host commuting appliance or other line input capable of carrying sound and directly or indirectly connected to the sound card on the computing appliance such as a PC.

The components of the chip are essentially identical to those describe in the example of FIG. 5 for the key jack circuitry. Therefore they shall retain the same element numbers and shall not be reintroduced. The difference in this implementation from that of the key jack implementation described above is that the chip 602 is removable from the card reader circuitry 602. In both cases of the smart card/reader and the key jack, the reader has no processing components. The microprocessor 409 is part of the chip. Another variation that separates the two described embodiments is that in this example, modem 406 and the serial interface 408 share the same international standards organization (ISO) contacts.

In still another embodiment of the present invention, a key jack or a smart card coupled to a card reader is not required to successfully practice the present invention. The token may instead be embodied as a sound file containing the ID number and session key that is simply stored on a PC hard drive or, in one embodiment on a USB flash drive or other removable media for better security. In the later case, the sound file token, which may be a way file or other audio compression format, is entirely mobile (if stored on a removable drive) and may be generated and stored on the removable drive by an applet downloaded to the host PC. It is important to note herein that a user may utilize the token at any station having the required network connection capabilities by plugging the removable drive containing the token into that station. An applet though would have to first be downloaded to that station for updating the session key in one embodiment.

In another embodiment however the applet may also be an executable stored on the same removable drive containing the token. For example, in a preferred embodiment the applet is a Java applet utilizing a java archive (JAR) including the token parameters and current session key. The applet and token parameters may be downloaded to a same removable media wherein session key updates are performed on the removable media instead of on the host appliance.

The only requirement of the host appliance is that it has a version Java installed and accessible to the network browser that recognizes the applet and JAR file on the removable media such as a re-writable (RW) compact disc (CD) or a flash drive. In this embodiment, extensions may be created to enable older versions of Java installed on older operating systems to recognize the Java applet and JAR file. In this way no initial download of an applet is required of the host PC.

The server may dynamically send a new session key upon connection established thereto by the host PC. The session key may be downloaded directly onto the removable media and the applet already on the removable media may automatically update the token for next use. In this way a user may perform a secure transaction from any host station running a compatible version of java or an older version of Java adapted by extension to recognize the latter version applet and JAR file. Moreover, the transaction may occur in a secure manner leaving no trace of the activity on the host PC.

In one embodiment using a sound file, the sound file may be updated by a PC-based applet, which includes a FSK modem generating the modulated signal based on a new session key received from the server. Alternatively, the sound file is updated by the server during a session with the host PC periodically lie every week or month. This is a static or quasi-static implementation of the system since the same session key is used for several authentications instead of being valid only for one authentication.

Figure 7:
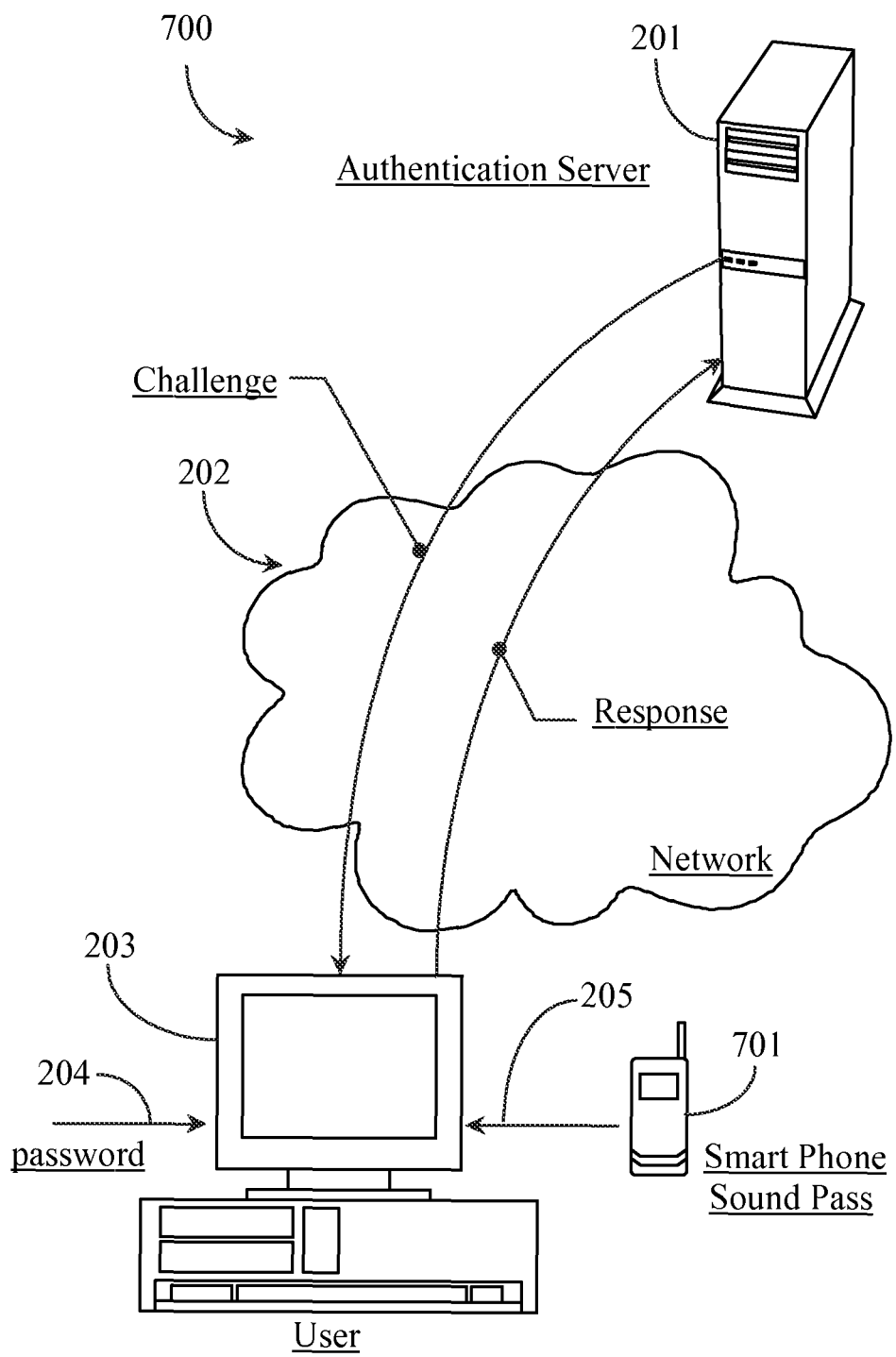
FIG. 7 is an architectural overview of interaction using the system of the invention including authentication server and a mobile device for signal generation according to yet another embodiment of the present invention.

FIG. 7 is an architectural overview 700 of interaction using the system of the invention including authentication server 201 and a mobile device 701 for signal generation according to yet another embodiment of the present invention. As described above, in one embodiment a sound file may serve as the token that includes the user ID number and session key as previously described.

In this example, a modulated audio signal is generated by a sound-generating applet installed on and executable from mobile device 701, which is a smart phone in this example. In another embodiment, phone 701 may instead be a PDA or a hand-held music player such as an Ipod™

In one embodiment a user enters a password or PIN on the PC via the keyboard of the PC. The output speaker system of mobile device 701 may be leveraged to play the modulated sound pass into a microphone plugged into PC 203. The microphone is plugged into the sound card on PC 203. The server challenge is a hash of the user password and the PC response is the modulated sound pass sent to the PC from mobile device 701 acoustically.

In another embodiment, mobile device 701 may include a hardwire cable that connects the speaker or headset output to the microphone input accomplishing the same task of inputting the signal. A PC-based applet on the PC demodulates the sound pass signal and communicates with the server to authenticate the user. In this example, the token on the mobile device if a sound file may not be updated by a PC applet or by the server through the host PC. However, in one embodiment the sound file may be updated by the applet on the device if the server sends a new session key to the mobile device directly or by the server contacting the telephone directly and establishing a secure network session with the device to update the file.

Figure 8:
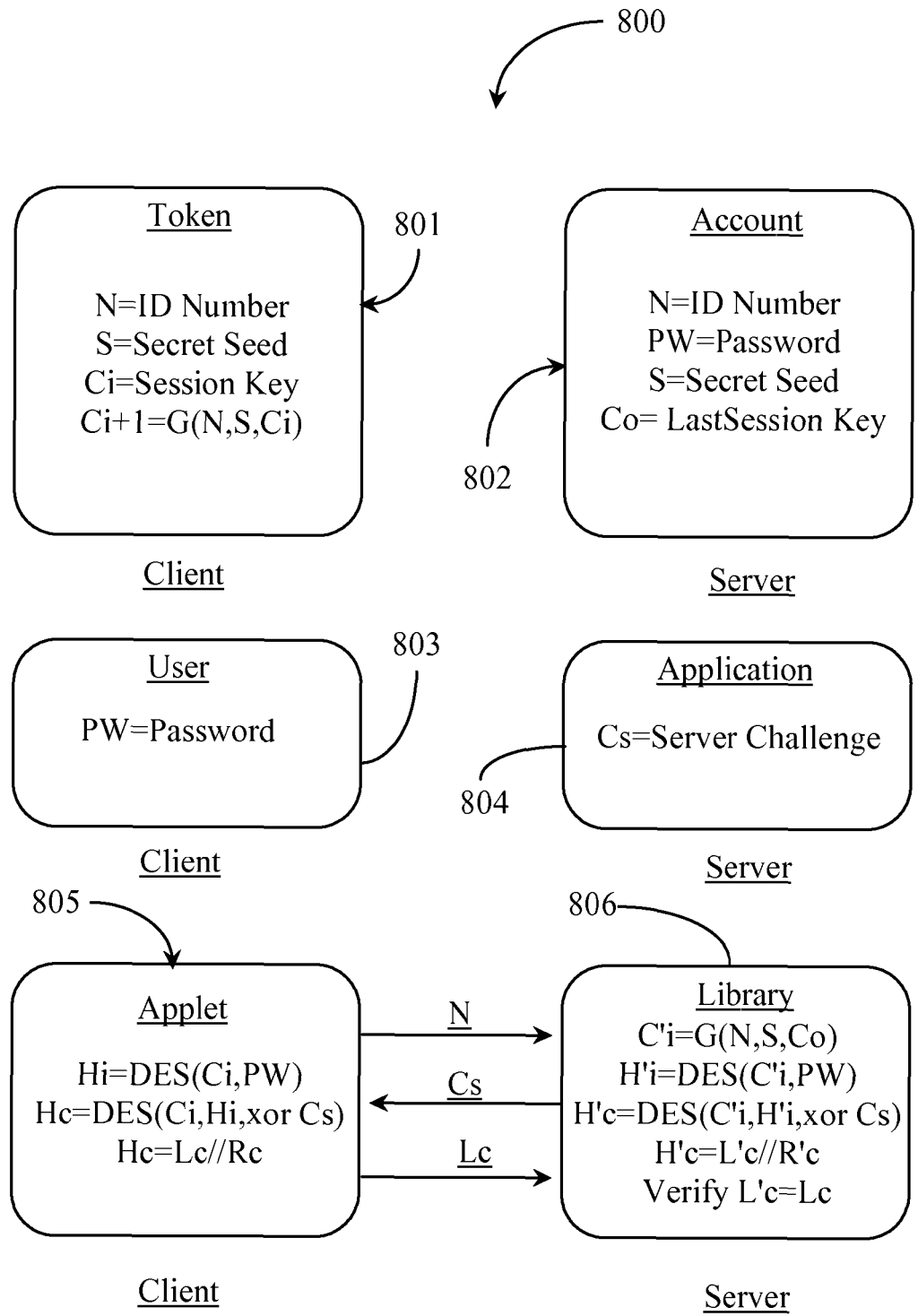
FIG. 8 is a block diagram illustrating user authentication and generation of a new session key by the token for use according to an embodiment of the present invention.

FIG. 8 is a block diagram 800 illustrating user authentication and generation of a new session key by the token for use according to an embodiment of the present invention. The token in this example is a hardware token like a key jack or smart card. The authentication process of the present invention may vary slightly according to the form of token used. This embodiment is applicable to the use of either a smart card or a key jack token host described further above.

In this example a client has a token 801 in the form of a key jack or smart card having the secure chip described in the circuitry diagrams above. Token 801 in this example includes the user ID number (N), a secret seed (S) provided by the authentication service, and a session key (Ci). Ci is the current session key stored on the token. In this case the token generates a new session key. A new session key that is generated by the token is expressed as Ci+1 which is =to a one-way function (G) of N, S, and Ci. Ci is the previous or current session key stored on the card, which may have been used in the last authenticated transaction made by the user. It is possible that Ci is a current key that has expired but was never used. The secrete seed (S) is a parameter issued to the client by the authentication entity or service and is known only to the issuing service. It is not specifically required in order to successfully practice the invention, but provides yet another enhancement to the hash code generation process.

At the server, an account belonging to the user is known. Server 802, which may be the authenticating entity, has stored therein parameters of the user account including N, a user password (PW), S, and record of the last session key (Co) used in an authentication. Co may or may not be the same key as Ci on the token. In this example the user token generates a new session key (Ci+1) for each subsequent secure transaction that requires authentication of the user. The server deduces the new session key from knowledge of the last-used session key in the same fashion as the token.

The user 803 has a password (PW) that is identical to the password recorded in the account data and that is the only parameter the user manually enters in this embodiment. The server has an application 804 that issues a server challenge among other tasks whenever the ID number (N) is submitted. The user sends N to the server, which identifies the user and the server sends back a sever challenge (Cs) back to the user. The server challenge has described further above may be a hash of the user ID number and password. An applet 805 generates an encrypted version (Hi) of the Ci and PW using a symmetric-key encryption method known as the data encryption standard (DES) available to the inventor. Other methods are possible without departing from the spirit and scope of the present invention.

A Hash code is generated from Hi using the session key again (Ci), adding an xor function, and the server challenge (Cs), which may be hashed or not. The resulting hash code is divided in two and only one of the halves of the code is used as a client response (Lc) in this example that is sent to the server (Rc). The process of encryption and hashing ensues after the server challenge is received at the client because the server challenge is a variable of the final hash code sent back to the server.

As the process unfolds, the server generates its own hash codes using the exact same parameters that the client used with the aid of the software driver (DLL) the codes cached temporarily in a code library 806. Library 806 represents the processing environment that the server uses to temporarily store data and make hash comparisons to validate clients. In the server library 806, the hash code generated by the server is compared to the one received by the client. If the compared codes are identical, L'c=Lc, then it provides absolute assurance that the client and the server used the same session key and the same password.

Figure 9:
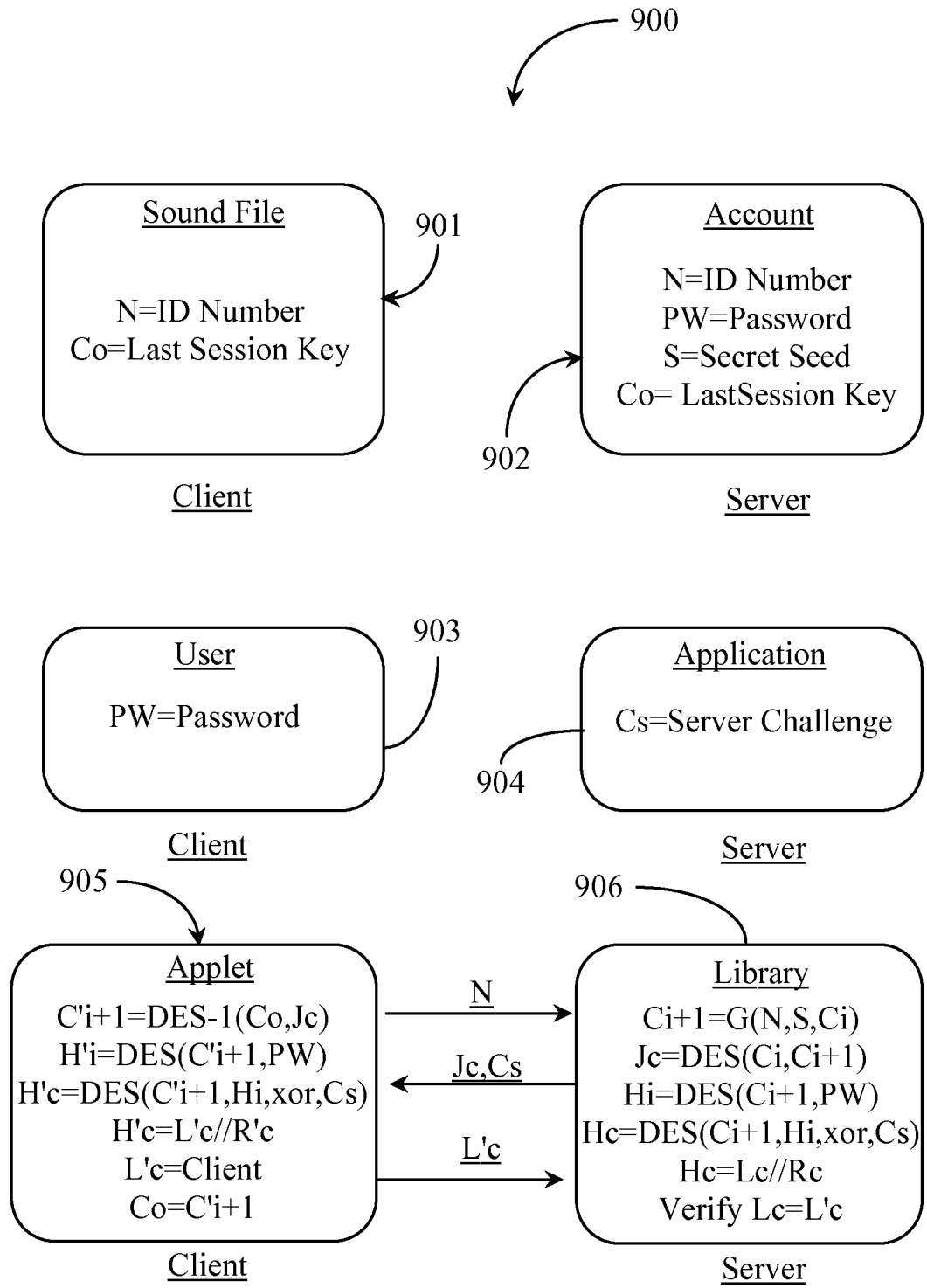
FIG. 9 is a block diagram illustrating user authentication and update to a sound file token and a server-transmitted session key according to an embodiment of the present invention.

FIG. 9 is a block diagram 900 illustrating user authentication and update to a sound file token 901 and a server-transmitted session key according to an embodiment of the present invention. In the last embodiment, the token at the client location generates a new session key. In this example, the server generates a new session key.

The client has a sound file token 901 located on a PC or on some external device like a cell phone, PDA, or other handheld device capable of playing the sound file. The current sound file has the user ID number and the last session key sent to the server at the last successful transaction that required authentication. At server side, the client account parameters defining account 902 are known and include N, PW, S, and Co as described with respect to FIG. 8 above.

In this case, a user 903 manually enters a password (PW) known only to the user and to the server. A server application 904 provides a server challenge and a new session key transmission (Jc) to the applet running on the user PC. The server challenge is required by the applet running on the PC in this case to generate the proper hash code for return to the server as L'c and to obtain the new session key for use.

In this case, the server, within the library 906 generates a new session key after the correct identification number (N) is received from the client. The key is expressed in this case as $Ci+1$ and is derived from a one way function (G) of N, S, and Ci, or $Ci+1=G(N,S,Ci)$. In library 906, the transmission (Jc) is the new session key encrypted with the last session key (Ci) or Jc=DES (Ci, Ci+1).

The server sends Jc and the server challenge (Cs) together in one transmission back the client. The client generates a first hash (H'i), which is an encryption of the new session key sent by the server and the password or H'DES (C'I+1, PW). The server performs an identical hash in the library or Hi=DES (Ci+1,PW).

The applet on the client generates a final hash code (H'c) which is an encryption of Hi and the server challenge using the received session key and adding an xor function or H'c=DES(Ci+1,Hi,xor,Cs). The server performs the same hash Hc=DES(Ci+1,Hi,xor,Cs). H'c then equals the client code to be compared with the server code. The client sends L'c to the server and stores C'I+1 (new session key) as Co (the last session key used). The last operation occurs after the client is successfully validated. L'c is compared to Lc at the server and if the hash codes are identical, authentication is successful.

Figure 10:
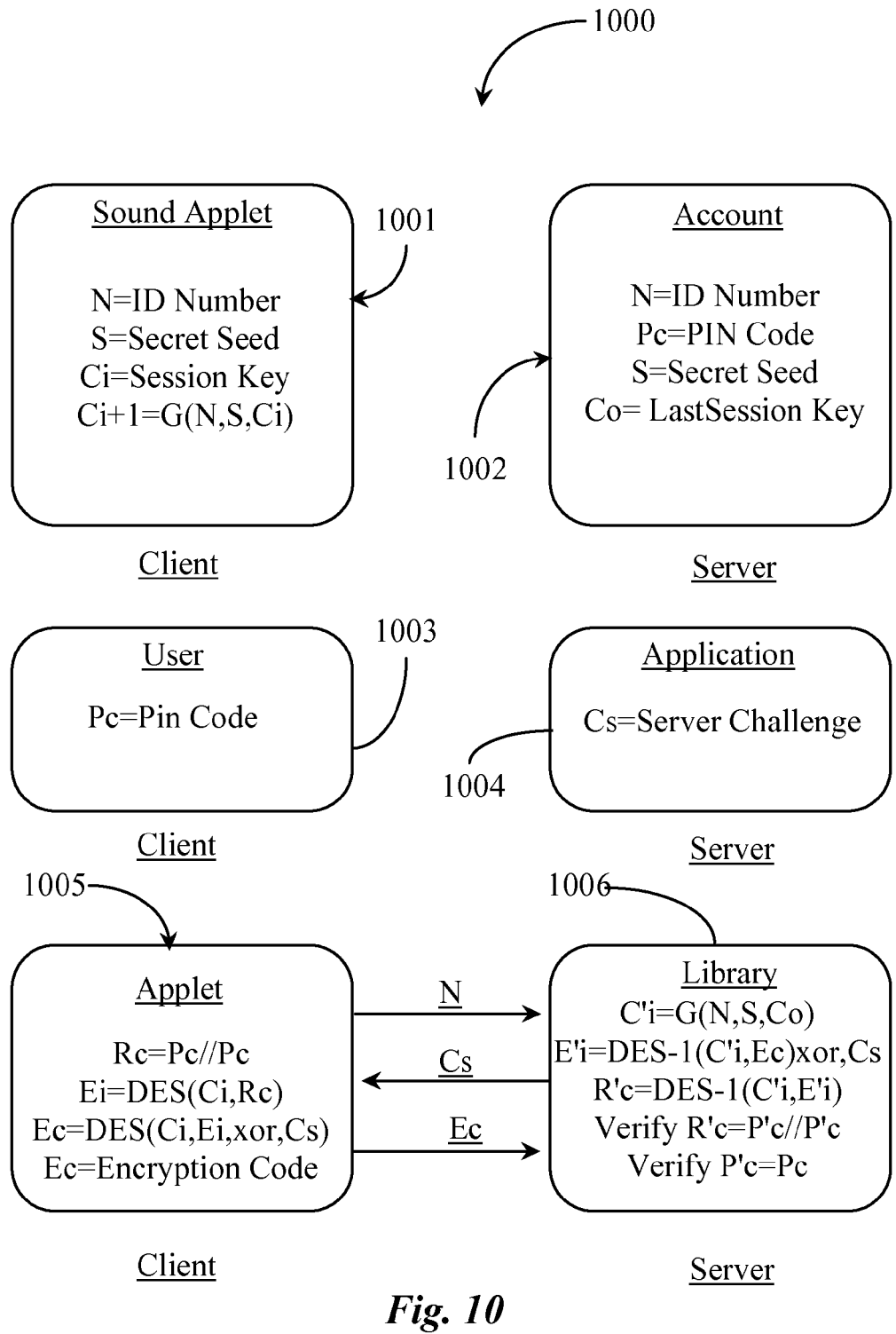
FIG. 10 is a block diagram illustrating user authentication and a method for generating a new session key for a user according to another embodiment of the present invention.

FIG. 10 is a block diagram 1000 illustrating user authentication and a method for generating a new session key for a user 1003 according to another embodiment of the present invention. In this example, the token is a sound file stored on a device like a cell phone or a PDA and a sound applet 1001 is provided to the mobile device to perform the modulation, demodulation and encryption. The client token includes N, S, and Ci. The sound applet 1001 generates a new session key expressed as $Ci+1$, which is =to G(H,S,Ci) where G is a one-way function. The known account parameters of the client account 1002 stored by the server are N (ID number), PW (Password), S (Secrete Seed), and Co (Last Session Key) used by the client.

In this example, user 1003 enters a PIN code (Pc) and plays the modulated sound into the microphone input of the PC acoustically using the speaker system of the mobile device. In one embodiment, the mobile device may be cabled to the microphone input from the speaker output or headset output. The client account 1002 at the server domain includes the parameters N, Pc, S, and Co.

In this implementation the user entered PIN code is duplicated Rc=Pc||Pc. A value Ei is generated and is an encryption of Ci and Rc or Ei=DES(Ci,Rc). Eventually, the PC applet 1005 creates an encryption code (Ec) that is the encryption of Ei and Cs using the session key (Ci) and adding an xor function. Expressed in this example, it is Ec=DES(Ci,Ei,xor,Cs). Ec is decrypted at the server using the session key stored in the account parameters.

Figure 11:
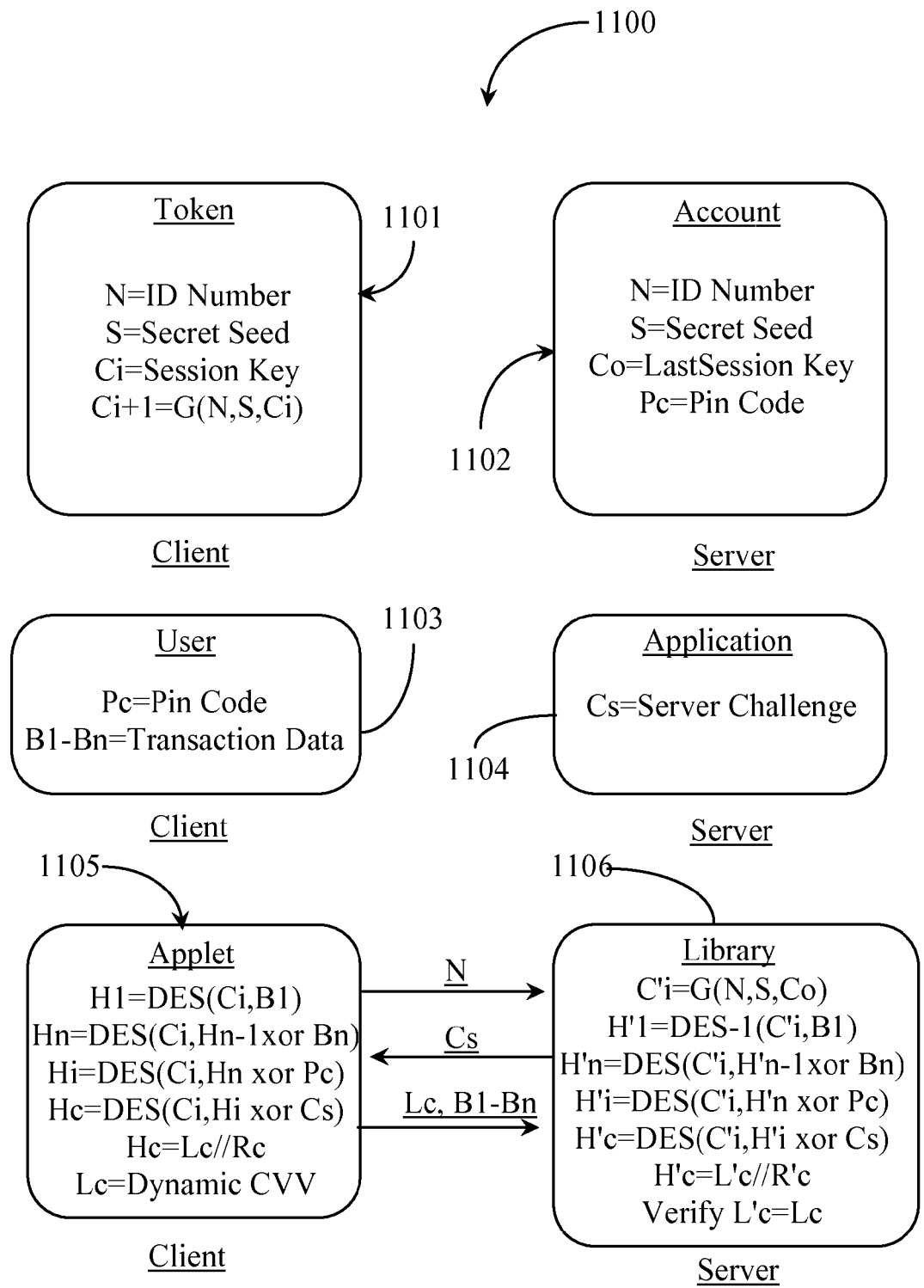
FIG. 11 is a block diagram illustrating user authentication using a card verification value (CVV) code according to yet another embodiment of the invention.

FIG. 11 is a block diagram 1100 illustrating user authentication using a card verification value (CVV) code according to yet another embodiment of the invention. In this example, banks or other financial institutions deploy secure smart cards in the form of bank cards having the sound pass token chip embedded thereon. The cards are adapted as a variation of the smart card used with a card reader plugged into a microphone jack on the user PC as described further above.

In this example the token (bank card) includes the token parameters of N, S, and Ci where Ci is the current session key. N (ID number) is different than the issued card number in this example for better security, but it includes the ID of the card issuing entity and enables the bank to route the transaction along with the CVV number (3-digit number) using existing bank protocols. The client account 1102 includes the ID number (N), the secrete seed (S), the last session key used by the client (Co), and the client PIN code (Pc).

Like the smart card or key jack implementation described further above, the token generates the new session key expressed as $Ci+1=G(N,S,Ci)$. The user may enter a PIN code (Pc) and then may perform a series of banking transactions by submitting transaction data B1-Bn. For each transaction, a new hash code (Hc) is generated by applet 1205 on the client PC. The final Hc is a dynamic card verification value (CVV) based on the session key, the transaction data (b1-Bn) for the instant transaction, and the Pc. In this example, Hc=Lc, which is sent to the server for each transaction and must be verified for each transaction.

The server generates its own hash to determine L'c, which is compared to the received Hc Lc for each transaction wherein the authentication is defined by the compared hash codes being identical. In this example, the server hash operation occurs after the user has entered his or her PIN code and the instant transaction data for that session. Otherwise, the server would not have any knowledge of Bi-Bn and could not match the client hash.

One with skill in the art of encryption will appreciate and understand the multi step encryptions using the session key at the client and the parallel encryption performed at the server so that the final hash codes may be compared. The actual process never reveals any clear text data that could become compromised. In fact, in all of the embodiments of the invention, the server may store the user ID number Username, Password, PIN, etc in permanently encrypted format.

Figure 12:
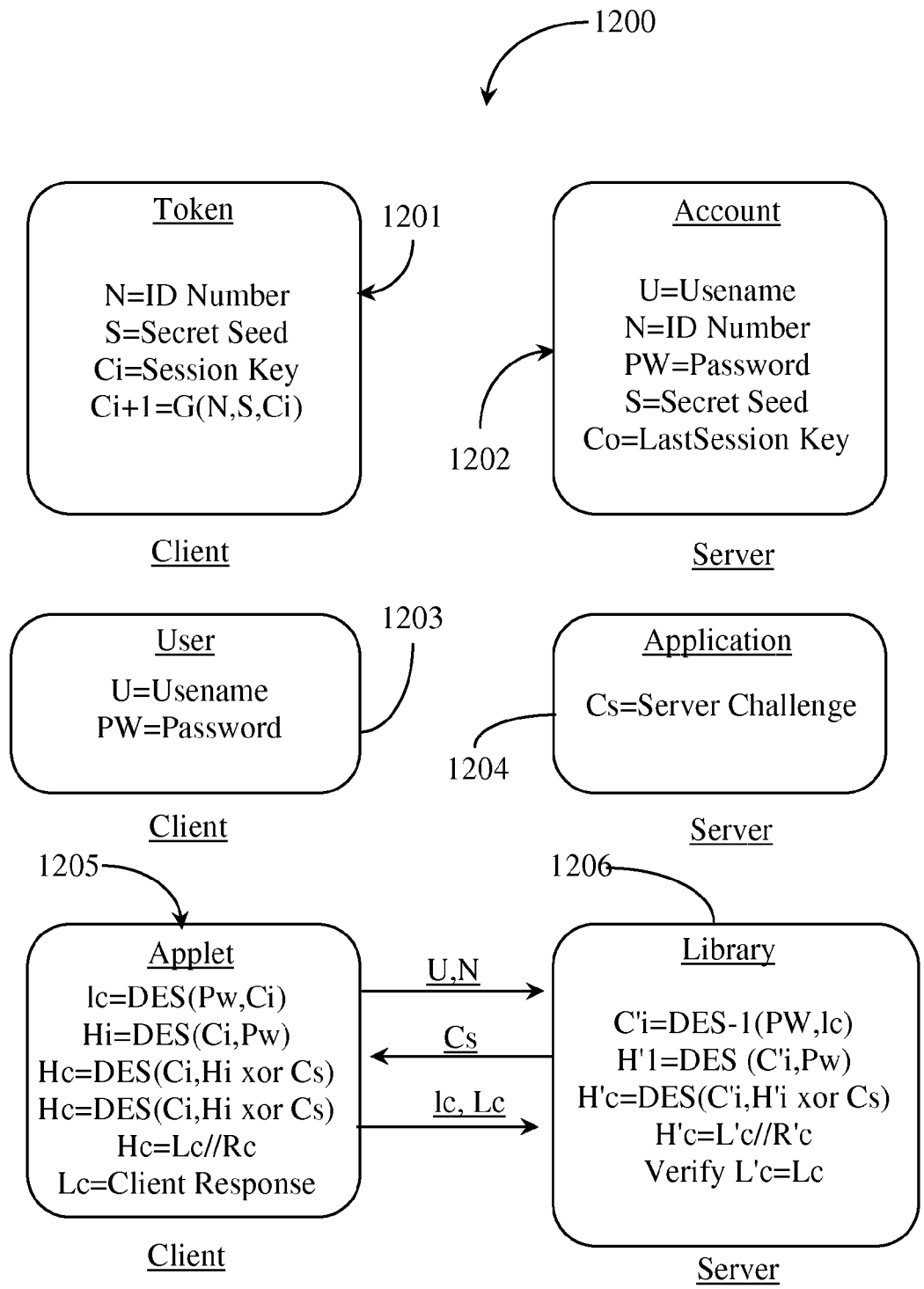
FIG. 12 is a block diagram illustrating user account activation on a server according to an embodiment of the present invention.

FIG. 12 is a block diagram 1200 illustrating user account activation on a server according to an embodiment of the present invention. An activation protocol is used for clients that are activating their accounts for the first time. The activation protocol automatically activates the system software on the server. In this example, the user 1203 enters his username (U) and password (PW). Token 1201 includes the issued ID number (N), the secrete seed (S), a current session key (Ci) and the token generates the new session key (Ci+1, which is a one way function (G)(N,S,Ci). In initial use, account 1202 includes the username (U) in addition to N, PW, S, and Co. Note that Co is only available to the server after authenticating the client for the first time.

The user 1203 accesses his account 1202 with his username and password. The first time he is using a sound pass token, the ID number and new session key are transmitted to the server and stored in the database only after authentication. The session key is encrypted (Ic) with the password prior to transmission to the server.

Figure 13:
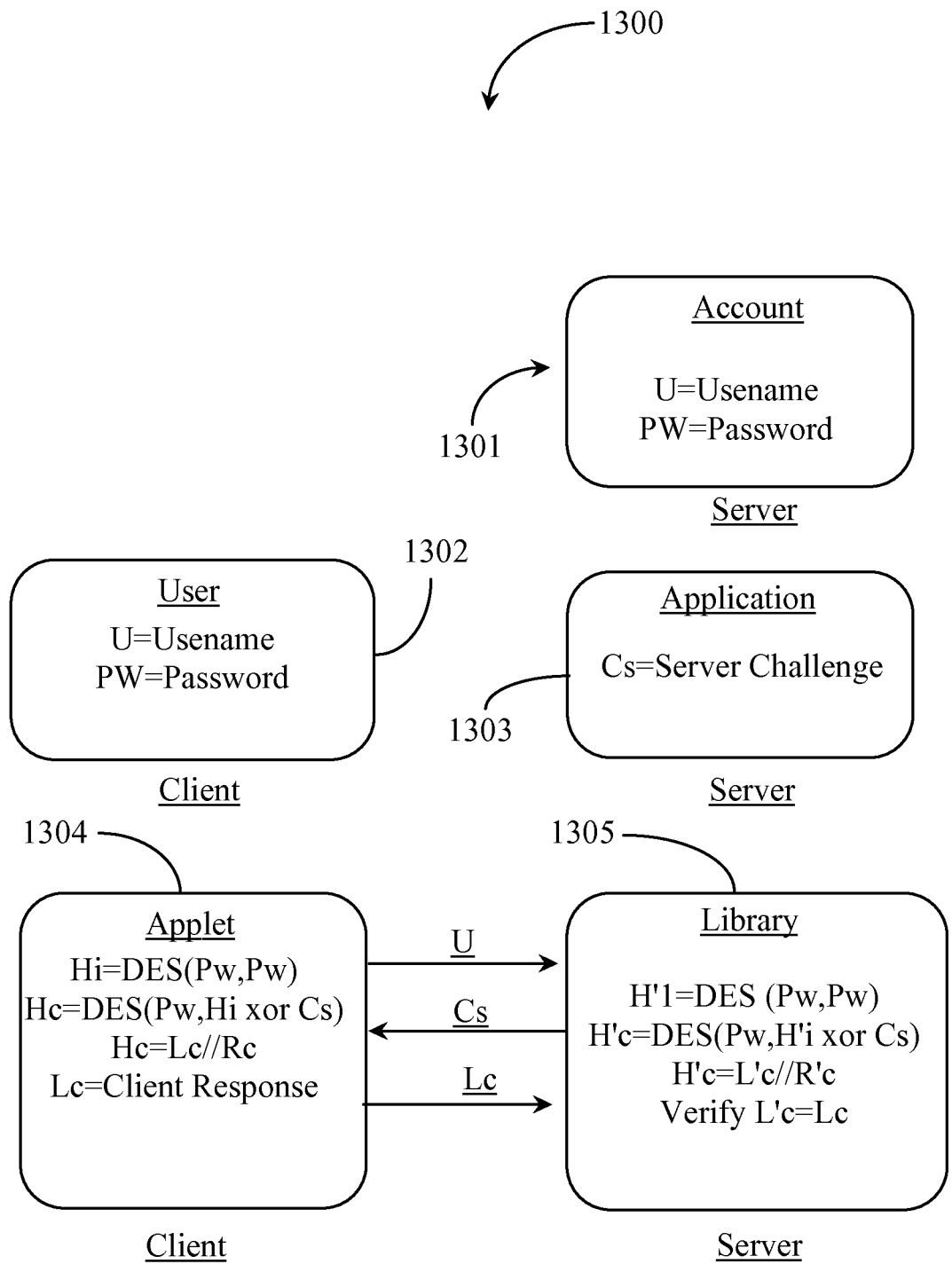
FIG. 13 is a block diagram illustrating user authentication using a password as a session key according to yet another embodiment of the invention.

FIG. 13 is a block diagram 1300 illustrating user authentication using a password as a session key according to yet another embodiment of the invention. In this case, the client 1302 knows the username (U) and the password (PW) to access account 1301. Account 1301 has U and PW stored as parameters. In this case, user 1302 does not have a token available because he has forgotten it or otherwise does not have access to it.

In this case, user 1302 enters U and PW to access the account. The applet 1304 on the client PC creates a session key from the PW Hi=DES(PW,PW). The application 1303 at the server sends a server challenge (Cs) to the client. The applet 1304 on the client PC generates a hash code (Hc), which is a DES encryption of the PW, the previous encryption (Hi) and the server challenge (Cs) adding an xor function. The Hc is the client response (Lc) sent to the server. Although this implementation is less secure because the session key is fixed, the method still ensures a permanent encryption of the password. In a preferred embodiment, this implementation may provide only a limited access to the user account.

Creating and Retrieving a Soft Token

In one embodiment of the present invention the token is not a secure chip but a software file that works with a server driver (dll) and a client applet. The soft token can be made portable and can be duplicated to portable or removable drives. It is important to note herein that the token values are expressed as a modulated sound pass signal and that, in most secure embodiments a new session key is used for each token hash operation. In this way, the token contents never change, but the hash value of those contents sent to the server is never the same.

Figure 14:
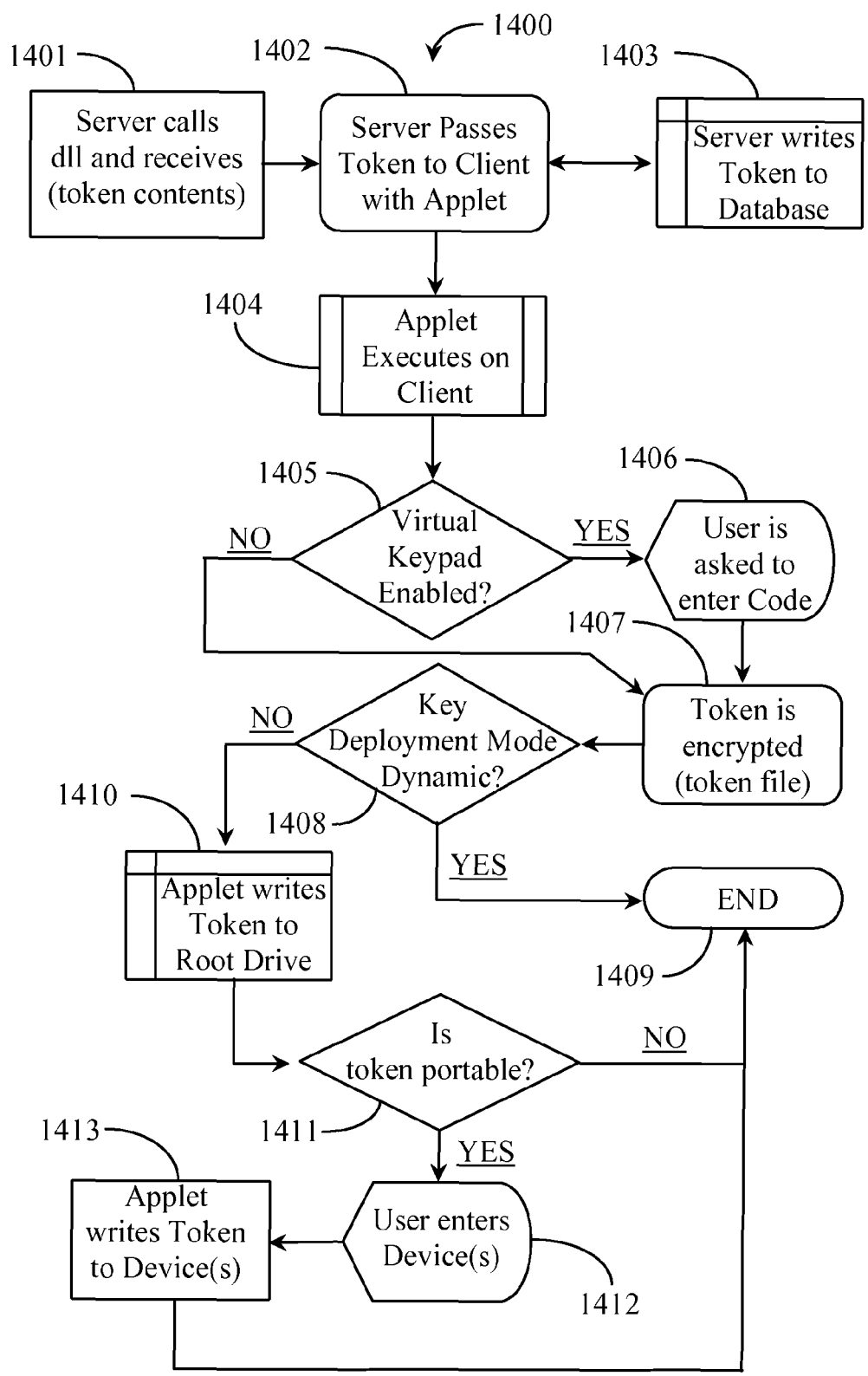
FIG. 14 is a process flow chart illustrating acts for creating a soft token for authentication for a user according to embodiments of the present invention.

FIG. 14 is a process flow chart illustrating acts 1400 for creating a soft token for authentication for a user according to embodiments of the present invention. In general use, a soft token is created for the client and the token, which is a sound file or generated sound is used with a session key to produce the hash code that authenticates the user for each transaction that requires authentication.

In act 1401, the server calls a driver or dll at the server or in some connected machine and receives randomly written token contents that provide the basis for future client access of one or of more than on account held for the client by one or more services. It is possible that the token issuer and the authentication entity is a third party to the transaction between a client and a service organization maintaining an account for the client.

In act 1402, the authentication server passes the token contents as clear text string along with a software applet to the client. The applet automatically installs itself either in the clients Web browser as a plug-in or as a separate instance. The applet and the token together may be packaged as a Java-based solution, more particularly an executable Java Archive (JAR) file. The solution includes the domain of the parent application or server-side dll. At act 1403, the server replicates or writes the token contents into a database at the server. Token contents may include, but are not limited to a user ID number, a secrete seed, and an initial session key. Account parameters may include a password or PIN in addition to the other components mentioned above.

When the applet is received at the client, it executes on the client for the purpose of creating the token file at act 1404. In one embodiment there is a virtual keypad included as part of the applet program that may be used by the client to enter an encryption code for the purpose of encrypting the token file. In act 1405, it is determined if the virtual keypad is enabled or not. It may be a matter of user preference. If the virtual keypad is enabled at act 1405, then at act 1406, the user is prompted to enter a code to use as an encryption key. In one embodiment, the user-entered code is message-digest algorithm 5 (MD5) hashed and the hash value of the code is used as the encryption key. In a variation of this embodiment, random salts are added on each end of the token string before encryption. Salts are known in the art and used in DES sometimes to strengthen encryption. MD5 is a well-known hash used for many security applications and for file integrity checking. Other known or future-developed hash algorithms may be used in other embodiments without departing from the spirit and scope of the present invention.

At act 1405, if it is determined that a virtual keypad is not available, then a default code is used and the process skips to act 1407 where the token is encrypted using the MD5 hash value described above or some other value derived from a hash operation.

At act 1407, the token contents are encrypted according to either case of user-entered code or default code, and written to a token JAR file in a preferred embodiment. In the preferred implementation the applet is a Java applet leveraging a token file, which is a JAR file. At act 1408, it is determined if the token deployment mode will be dynamic or not. This option may be pre-set as a default by the token issuer or it may be an election granted to the user. Dynamic deployment mode is an option that prevents any storage of the token at the client machine. In the case of dynamic deployment, the user will immediately use the issue token to perform a secure transaction after which the token is no longer valid. In act 1408 if deployment mode is dynamic then the process ends at act 1409.

If is act 1408 the token deployment mode is not dynamic, then at act 1410 the applet write the token file in encrypted form to the root drive on the client PC. At act 1411 it is determined if the token will be a portable token or not. This option may be a user preference. If at act 1411 the token is not portable, then the process ends at act 1409. If at act 1411 it is determined that the token is a portable token, then at act 1412, the user enters the parameters for the device or devices that will receive the token or a replicate of the token. These parameters may include a device machine address if the device is on a network, or drive letter id the device is directly attached storage (DAS). After the user enters the correct information, the applet writes or replicates the token to the appropriate storage devices at act 1413. The process ends at act 1409.

One with skill in the art of encryption will appreciate that the exact encryption system and methods employed may vary somewhat without departing from the spirit and scope of the present invention. For example, MD4 may replace MD5 as the hash method for the personal or default encryption code. Salts may be used or may not be used. It is reminded here for clarity that the ID number and session key are embedded into the generated sound or sound file or sound pass that is the token, each time the token is activated, a new session key is generated in a preferred embodiment.

Figure 15:
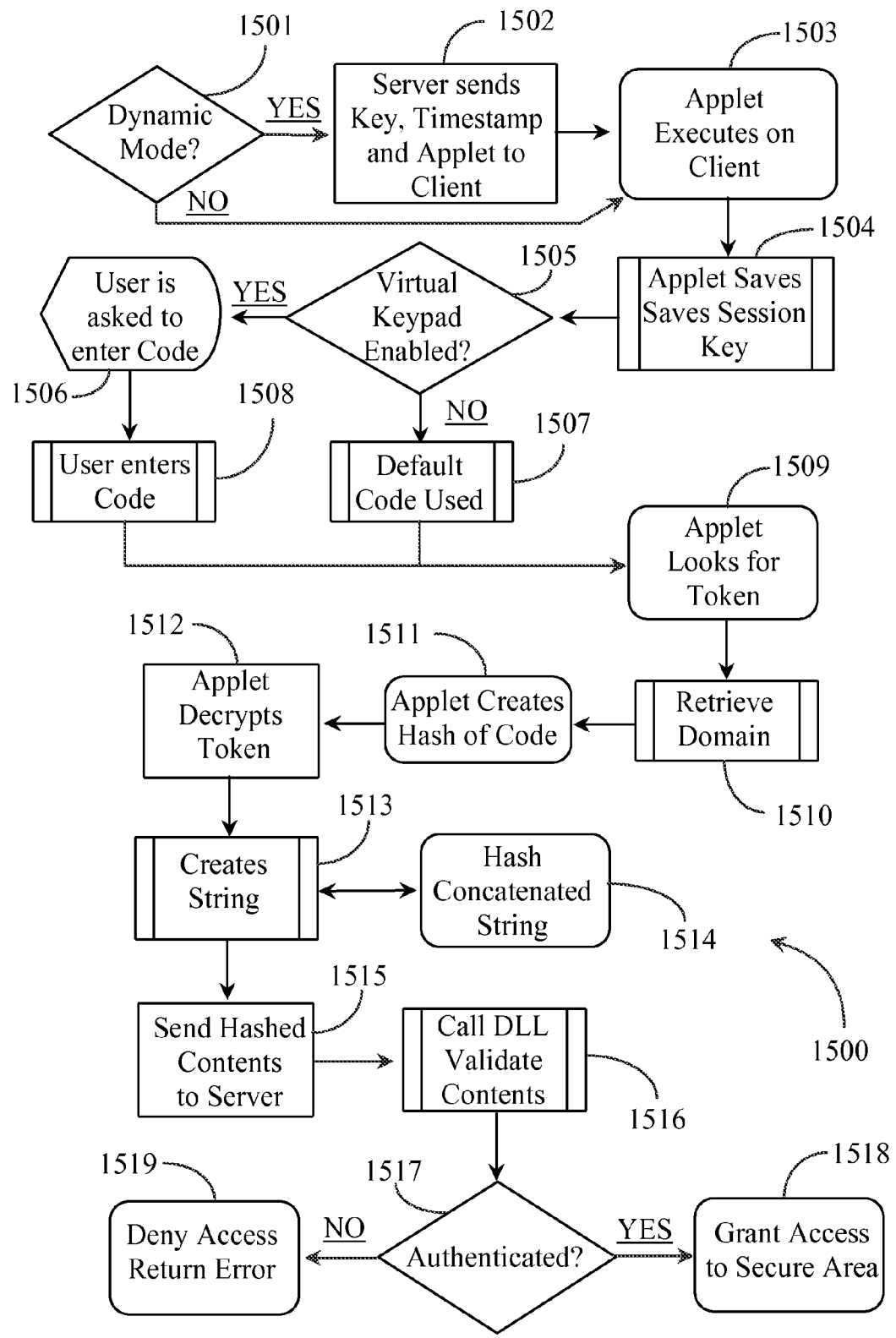
FIG. 15 is a process flow chart illustrating acts for retrieving or activating a soft token for authentication according to embodiments of the present invention.

FIG. 15 is a process flow chart illustrating acts 1500 for retrieving or activating a soft token for authentication according to embodiments of the present invention. At act 1501, it is determined whether the token deployment is dynamic mode or not. Dynamic mode means that there is no token resident on the client PC. If at act 1501 dynamic mode is enabled, then at act 1502 the server sends a session key, timestamp and applet to the client. If at act 1501, dynamic mode is not enabled, then the process skips to act 1503 wherein the applet executes of the client PC. In either case, the applet executes on the client PC in act 1503 and saves the session key in act 1504.

At act 1505 it is determined whether the virtual keypad is enabled or not. If at act 1505, the virtual keypad is enabled, then at act 1506 the user is asked to enter a code to use in encryption of the session key saved in act 1504. At act 1508 then the user enters the code. If the virtual keypad is not enabled at act 1505, then a default code is used at act 1507. The code is used to decrypt the token contents. In dynamic mode the applet has the token. If the mode is not dynamic then at act 1509, the applet looks for the client token. The applet will use the first token it finds if there are multiple portable tokens or if the token is otherwise resident in more than one location accessible to the applet at the time.

At act 1510, the applet retrieves the domain of the token issuer to ensure it is the correct token. At act 1511, the PC applet creates an MD5 hash of the user-entered code of act 1508, or of the default code of act 1507. If operating in dynamic mode, the applet also updates the exiting token contents with the passed contents. At act 1512, the PC applet uses the hash to decrypt the token contents including removing any salts from the token contents. At act 1513, the PC applet concatenates the token value domain name and timestamp received from the server if dynamic mode is enabled. At act 1514, the applet performs an MD5 hash on the string of act 1513. At act 1515 the PC applet sends the hashed contents or content string to the authentication server.

At act 1516, the server calls the software driver (dll) to validate the contents of the string received from the client against the token and its domain retrieved from the server database. At act 1517 the dll attempt to authenticate the user by comparing the Parsed contents, which have been MD5 hashed by the client applet to a server hash of the token value, domain, and timestamp from the server. In act 1517, the server also checks to current time stamp against the current time. If it is operating according to dynamic mode. If the time stamp is not more than 2 minutes or so before the current time at the server, and the hashed values match then the user is authenticated in act 1517 and is granted access into the secure area at act 1518. The content string should equal the MD5 hash value of the server database token, the server domain and the original timestamp. Act 1518 may be access to a resource or it may be an approval or other type of user validation for a transaction.

If the hashed values matched but the time stamp window has expired in act 1517 then authentication fails and at act 1519 the server denies access or approval and returns an error to the user. Likewise, if the hashed values do not match identically then the user is not authenticated and the process moves again to act 1519.

It will be apparent to a skilled person that the examples and embodiments described in enabling detail above are not completely limiting to the invention. They are examples of practice of the invention. There may be many alterations that may be made in the described embodiments without departing from the spirit and scope of the invention. For example, readers and tokens may be implemented in many ways, in many shapes, and with a variety of materials, still within the scope of this invention. Further communications protocols may vary, and there are many ways of providing functionality critical to the invention with software beyond the examples given. It is not, for example, strictly limiting that the token generated is a sound file. Tokens may be provided in other ways as well. In one case one might provide a modulated light signal, or infrared signal to be read by an optical reader, the signal modulated to provide the same sort of information provided by the audio token described in detail above. The token might be a modulated vibratory signal. It could also be a character string coded in a fashion to provide the necessary input. Therefore the invention is limited only by the scope of the following claims.

What is claimed is:

1. An apparatus comprising:
a card reader having an input interface configured to accept transaction data from an output interface of a transaction card, and an output pin, as a part of the card reader, configured to directly connect the card reader to a microphone port of a smart telephone, the card reader providing the transaction data accepted from the output interface of the transaction card to the output pin, and hence to the microphone port, as an analog variable voltage audio signal; and
coded instructions stored in a non-transitory medium of a first Internet-connected server, and accessible by a user of the card reader;
wherein the coded instructions, when executed on a processor in the smart telephone, convert the analog variable voltage audio signal received at the microphone port to the transaction data as digital data, establish direct data exchange between the smart telephone and a second Internet-connected server and facilitate transactions by a financial institution, or purchases from an online-merchant, using the transaction data.

2. The apparatus of claim 1 wherein the coded instructions, when executed on a processor in the smart telephone, retrieve a card verification code (CVV), and use the CVV in purchases or transactions.

3. A method comprising:
accepting transaction data from a transaction card at an input interface of a card reader having an output pin as a part of the card reader, the output pin directly connecting the card reader in a microphone port of a smart telephone;
receiving the transaction data in the smart telephone as an analog variable voltage audio signal from the microphone port of the smart telephone;
converting the analog variable voltage audio signal received at the microphone port to the transaction data as digital data;
establishing direct data exchange with an Internet-connected server providing services to a financial institution or an on-line merchant by executing coded instructions on a processor in the smart telephone; and
facilitating transactions with the financial institution or purchases from the on-line merchant, using the transaction data.

4. The method of claim 3 wherein the coded instructions, when executed on a processor in the smart telephone, retrieve a card verification code (CVV) from the transaction data received on the microphone port, and use the CVV in the purchases or transactions.

* * * * *

(12) INTER PARTES REVIEW CERTIFICATE (3977th)

United States Patent
Colnot et al.

(10) Number: US 9,679,286 K1
(45) Certificate Issued: May 27, 2025

(54) METHODS AND APPARATUS FOR ENABLING SECURE NETWORK-BASED TRANSACTIONS

(71) Applicants: Vincent Cedric Colnot; Ty Fellers

(72) Inventors: Vincent Cedric Colnot; Ty Fellers

(73) Assignee: OHVA, INC.

Trial Number:

IPR2023-00921 filed May 18, 2023

Inter Partes Review Certificate for:

Patent No.: 9,679,286
Issued: Jun. 13, 2017
Appl. No.: 14/636,674
Filed: Mar. 3, 2015

The results of IPR2023-00921 are reflected in this inter partes review certificate under 35 U.S.C. 318(b).

INTER PARTES REVIEW CERTIFICATE
U.S. Patent 9,679,286 K1
Trial No. IPR2023-00921
Certificate Issued May 27, 2025

AS A RESULT OF THE INTER PARTES REVIEW PROCEEDING, IT HAS BEEN DETERMINED THAT:

Claims 1-4 are cancelled.

\* \* \* \* \*